(12) United States Patent
Sakamoto et al.

(10) Patent No.: US 10,747,219 B2
(45) Date of Patent: Aug. 18, 2020

(54) PROCESSING APPARATUS, VEHICLE, PROCESSING METHOD, AND STORAGE MEDIUM

(71) Applicant: HONDA MOTOR CO., LTD., Tokyo (JP)

(72) Inventors: Yosuke Sakamoto, Wako (JP); Kazuma Ohara, Wako (JP); Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 15/973,804

(22) Filed: May 8, 2018

(65) Prior Publication Data
US 2018/0348752 A1    Dec. 6, 2018

(30) Foreign Application Priority Data

May 31, 2017   (JP) ................................. 2017-108289

(51) Int. Cl.
| | | |
|---|---|---|
| *G05D 1/00* | (2006.01) | |
| *G06K 9/00* | (2006.01) | |
| *B60W 10/20* | (2006.01) | |
| *B60W 10/06* | (2006.01) | |
| *B60W 10/18* | (2012.01) | |

(52) U.S. Cl.
CPC ......... *G05D 1/0055* (2013.01); *G05D 1/0088* (2013.01); *G06K 9/00805* (2013.01); *B60W 10/06* (2013.01); *B60W 10/18* (2013.01); *B60W 10/20* (2013.01); *G05D 2201/0213* (2013.01); *G06K 9/00362* (2013.01)

(58) Field of Classification Search
CPC .... G05D 1/0055; G05D 1/0088; B60W 10/20
See application file for complete search history.

(56) References Cited

U.S. PATENT DOCUMENTS

2017/0329332 A1\* 11/2017 Pilarski ............. B60W 50/0097

FOREIGN PATENT DOCUMENTS

JP         2007-257338 A     10/2007

\* cited by examiner

*Primary Examiner* — Kimberly S Berona
*Assistant Examiner* — Andy Schneider
(74) *Attorney, Agent, or Firm* — Thomas | Horstemeyer, LLP

(57) ABSTRACT

A processing apparatus comprises a first determination unit configured to determine, based on peripheral information of a self-vehicle, whether another vehicle that is stopped exists on one side of a road in a width direction; a second determination unit configured to determine, based on the peripheral information, whether a walker exists on the other side of the road in the width direction; and a setting unit configured to, if the other vehicle exists on the one side of the road in the width direction, and the walker exists on the other side of the road in the width direction, set, for the other vehicle, a second warning region wider than a first warning region in a case in which the other vehicle exists, and the walker does not exist.

12 Claims, 12 Drawing Sheets

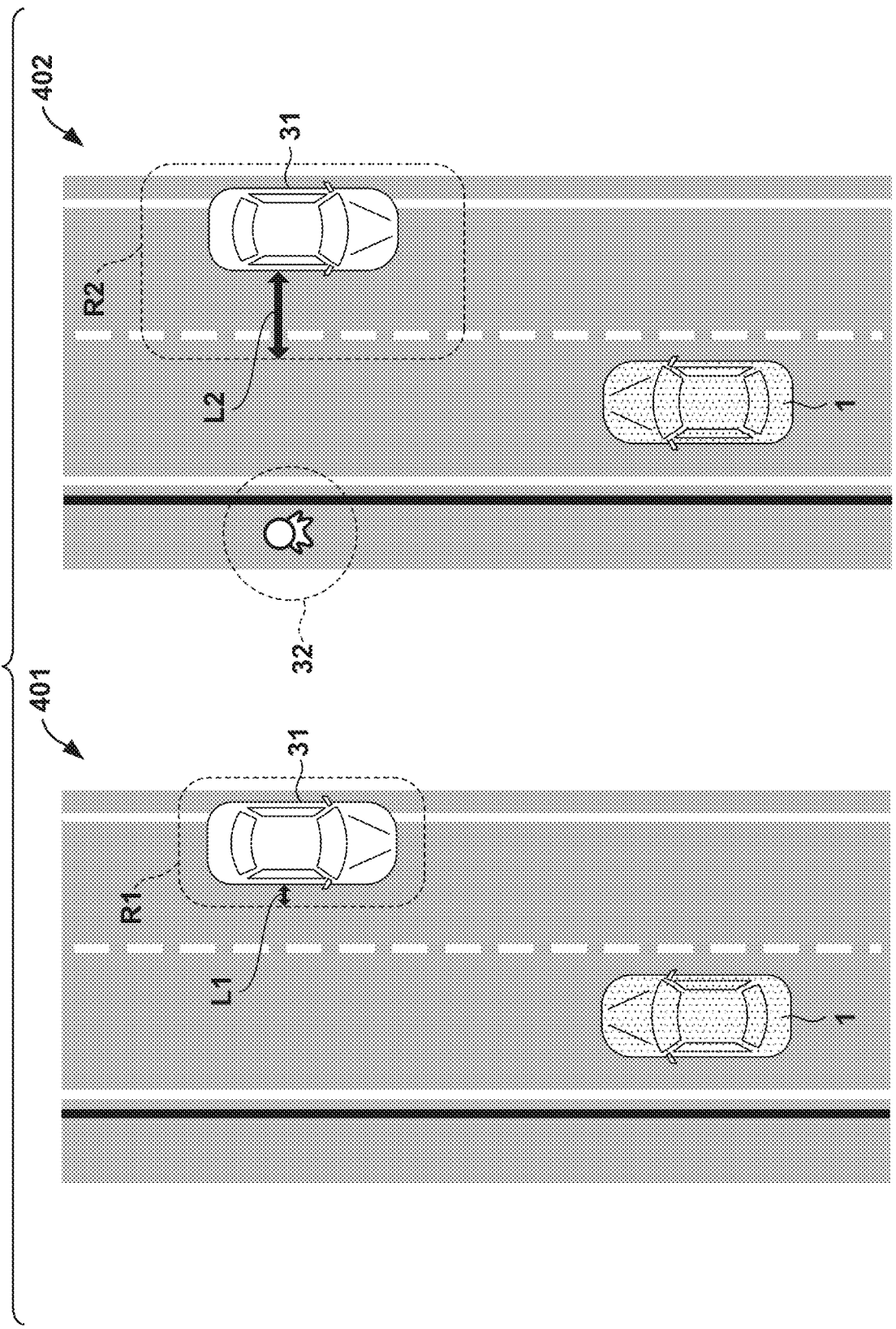

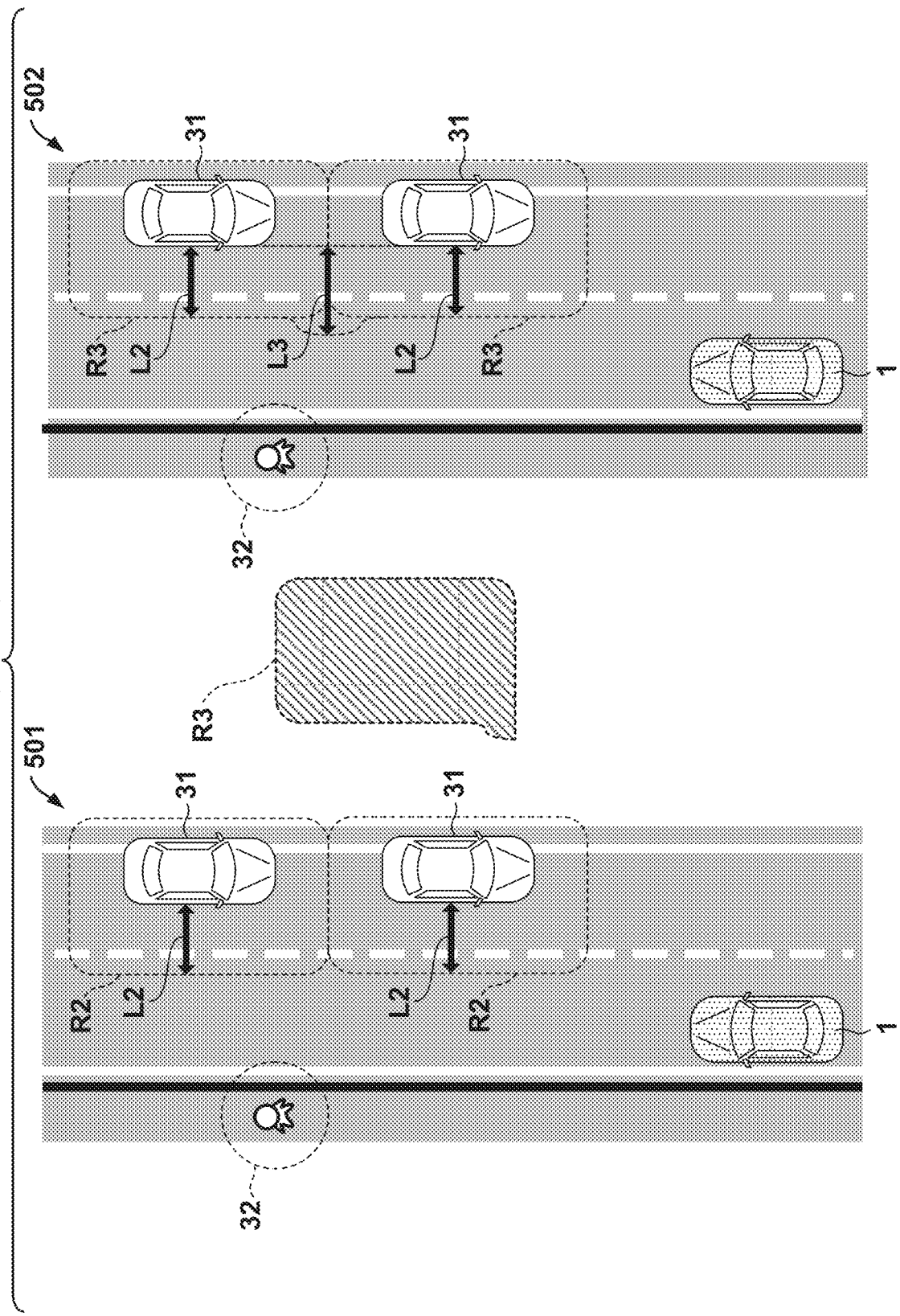

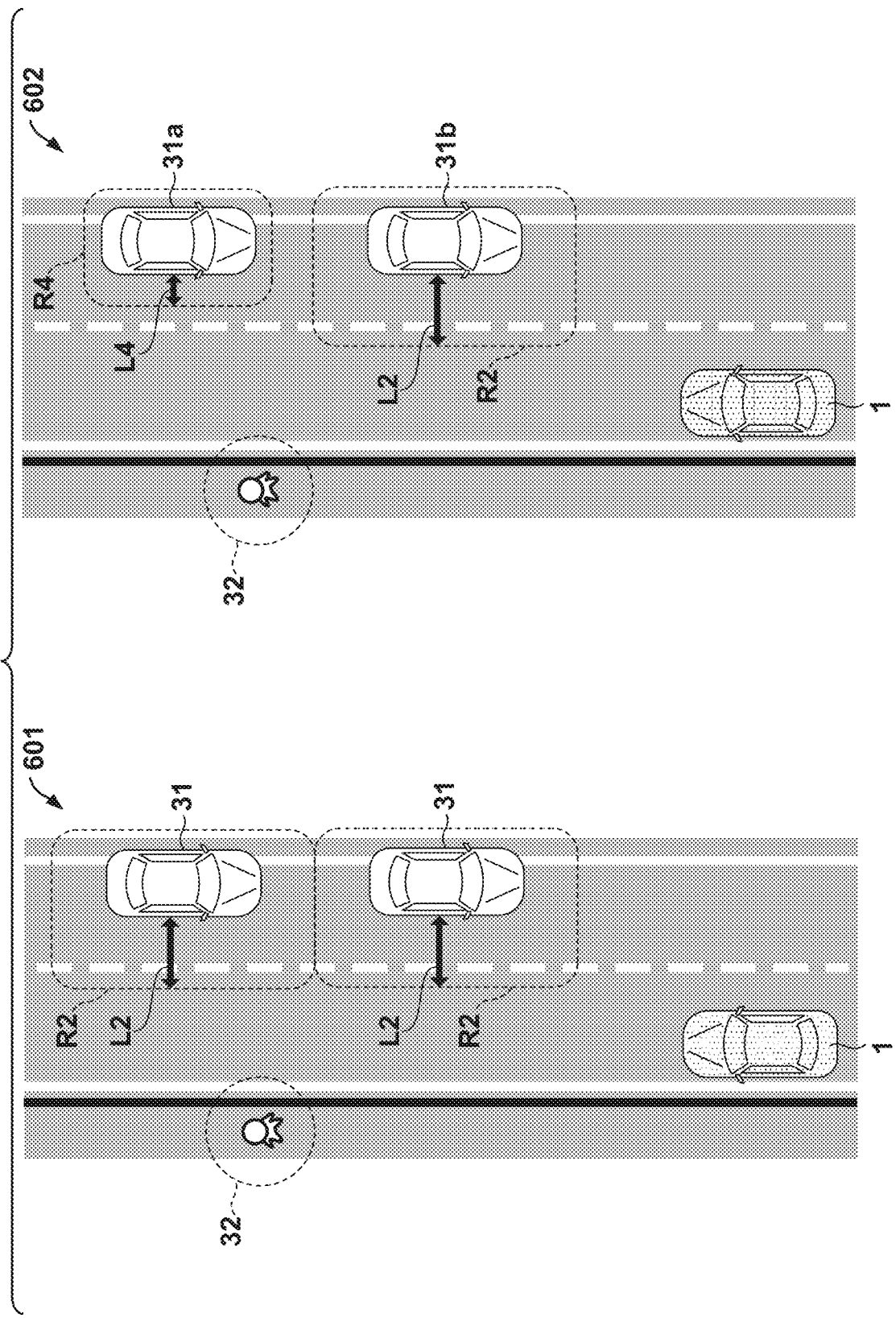

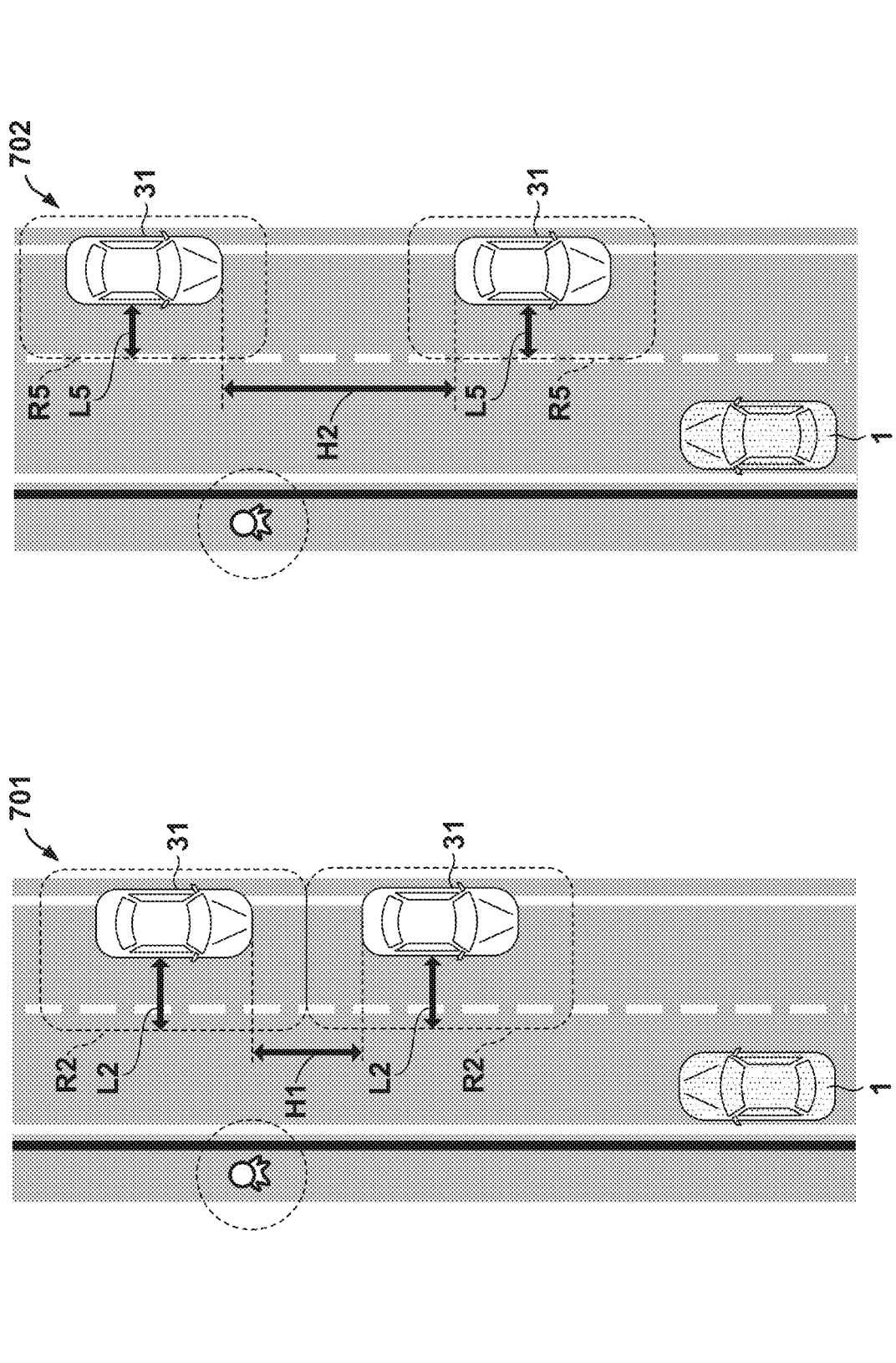

PROCESSING APPARATUS, VEHICLE, PROCESSING METHOD, AND STORAGE MEDIUM

BACKGROUND OF THE INVENTION

Field of the Invention

The present invention relates to a processing apparatus, a vehicle, a processing method, and a storage medium.

Description of the Related Art

Japanese Patent Laid-Open No. 2007-257338 describes controlling to receive data detected by each sensor, detect blind spots and barriers, estimate a collision probability to a run-out walker, and set and present an appropriate vehicle speed that keeps the collision probability to a reference value or less.

However, in a case in which, for example, a walker exists on one side of a road, and a stopped vehicle exists on the other side of the road, another person can run out from the vicinity of the stopped vehicle onto the road toward the walker. Such a case is not taken into consideration at all in patent literature 1.

The present invention provides a technique for implementing safer automated driving assuming run-out of a person onto a road.

SUMMARY OF THE INVENTION

In order to solve the above problem and achieve the object, according to the present invention, there is provided a processing apparatus comprising: an acquisition unit configured to acquire peripheral information of a self-vehicle; a first determination unit configured to determine, based on the peripheral information, whether another vehicle that is stopped exists on one side of a road in a width direction; a second determination unit configured to determine, based on the peripheral information, whether a walker exists on the other side of the road in the width direction; and a setting unit configured to, if the other vehicle that is stopped exists on the one side of the road in the width direction, and the walker exists on the other side of the road in the width direction, set, for the other vehicle, a second warning region wider than a first warning region in a case in which the other vehicle that is stopped exists on the one side of the road in the width direction, and the walker does not exist on the other side of the road in the width direction.

BRIEF DESCRIPTION OF THE DRAWINGS

FIG. 4A is an explanatory view of a warning region according to the first embodiment;

FIG. 5A is an explanatory view of a warning region according to the second embodiment;

FIG. 6A is an explanatory view of a warning region according to the third embodiment;

FIG. 7A is an explanatory view of a warning region according to the fourth embodiment.

DESCRIPTION OF THE EMBODIMENTS

Figure 1:
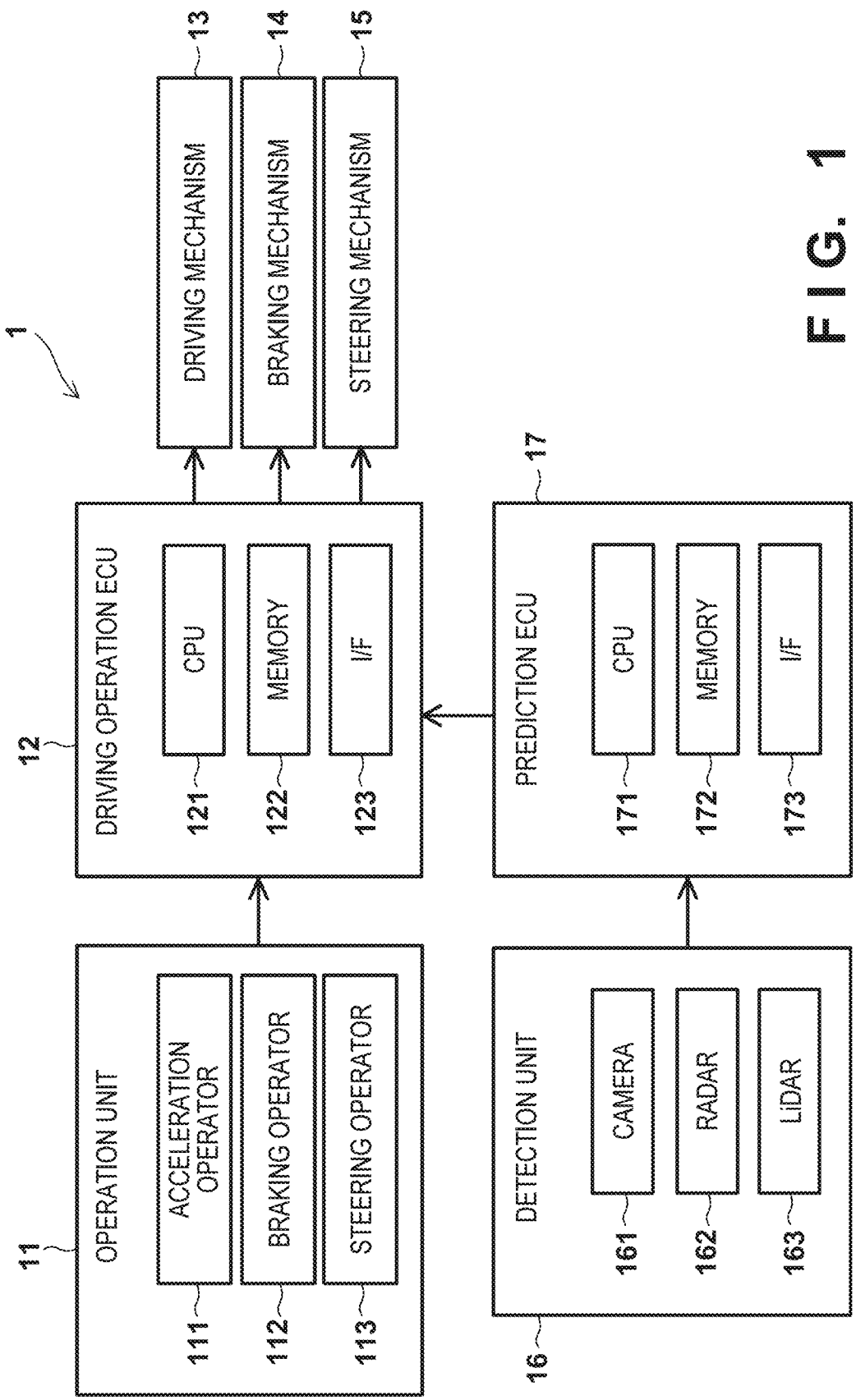
FIG. 1 is a block diagram for explaining an example of the arrangement of a vehicle.

Embodiments of the present invention will now be described with reference to the accompanying drawings. Note that the drawings are schematic views showing structures or arrangements according to the embodiments, and the dimensions of members shown in the drawings do not necessarily reflect the actuality.

First Embodiment

FIG. 1 is a block diagram for explaining the arrangement of a vehicle 1 according to the first embodiment. The vehicle 1 includes an operation unit 11, a driving operation ECU (Electronic Control Unit) 12, a driving mechanism 13, a braking mechanism 14, a steering mechanism 15, a detection unit 16, and a prediction ECU 17. Note that in this embodiment, the vehicle 1 is a four-wheeled vehicle. However, the number of wheels is not limited to four.

The operation unit 11 includes an acceleration operator 111, a braking operator 112, and a steering operator 113. Typically, the acceleration operator 111 is an accelerator pedal, the braking operator 112 is a brake pedal, and the steering operator 113 is a steering wheel. Operators of a lever type, button type, or the like may be used for these operators 111 to 113.

The driving operation ECU 12 includes a CPU 121, a memory 122, and a communication interface 123. The CPU 121 performs predetermined processing based on an electric signal received from the operation unit 11 via the communication interface 123. The CPU 121 stores the processing result in the memory 122 or outputs it to the mechanisms 13 to 15 via the communication interface 123. With this arrangement, the driving operation ECU 12 controls the mechanisms 13 to 15.

The driving operation ECU 12 is not limited to this arrangement, and a semiconductor device such as an ASIC (Application Specific Integrated Circuit) may be used as another embodiment. That is, the function of the driving operation ECU 12 can be implemented by either hardware or software. In addition, the driving operation ECU 12 has been described here as a single element to facilitate the explanation. However, this may be divided into a plurality of ECUs. The driving operation ECU 12 may be divided into, for example, three ECUs for acceleration, braking, and steering.

The driving mechanism 13 includes, for example, an internal combustion engine and a transmission. The braking mechanism 14 is, for example, a disc brake provided on each wheel. The steering mechanism 15 includes, for example, a power steering. The driving operation ECU 12 controls the driving mechanism 13 based on the operation amount of the acceleration operator 111 by the driver. In addition, the driving operation ECU 12 controls the braking mechanism 14 based on the operation amount of the braking operator 112 by the driver. Furthermore, the driving operation ECU 12 controls the steering mechanism 15 based on the operation amount of the steering operator 113 by the driver.

Figure 2:
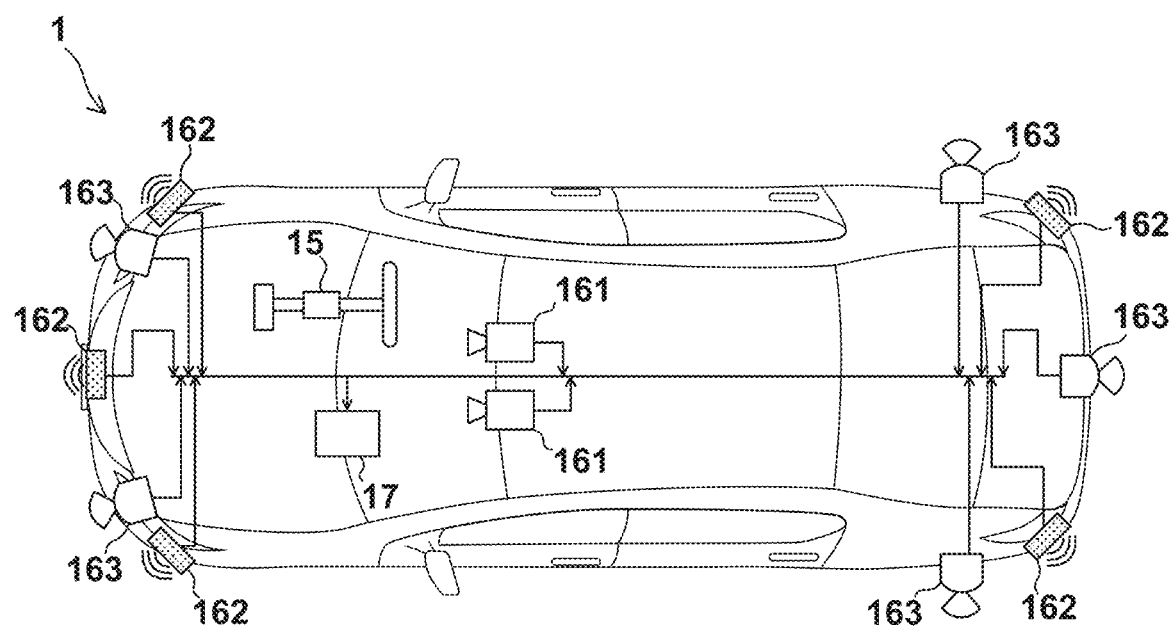
FIG. 2 is a plan view for explaining an example of the arrangement position of a detection unit.

The detection unit 16 includes a camera 161, a radar 162, and a LiDAR (Light Detection and Ranging) 163. The camera 161 is, for example, an image capturing apparatus using a CCD/CMOS image sensor. The radar 162 is, for example, a distance measuring apparatus such as a millimeter-wave radar. The LiDAR 163 is, for example, a distance measuring apparatus such as a laser radar. These apparatuses are arranged at positions where peripheral information of the vehicle 1 can be detected, for example, on the front side, rear side, upper side, and lateral sides of the vehicle body, as shown in FIG. 2.

Here, in this specification, expressions "front", "rear", "upper", and "lateral (left/right)" are used in some cases. These are used as expressions representing relative directions with respect to the vehicle body. For example, "front" represents the front side in the longitudinal direction of the vehicle body, and "upper" represents the height direction of the vehicle body.

The vehicle 1 can perform automated driving based on a detection result (peripheral information of the vehicle 1) of the detection unit 16. In this specification, automated driving means partially or wholly performing the driving operation (acceleration, braking, and steering) not on the driver side but on the side of the driving operation ECU 12. That is, the concept of automated driving includes a form (so-called full automated driving) in which the driving operation is wholly performed on the side of the driving operation ECU 12 and a form (so-called driving support) in which part of the driving operation is performed on the side of the driving operation ECU 12. Examples of driving support are a vehicle speed control (automatic cruise control) function, a following distance control (adaptive cruise control) function, a lane departure prevention support (lane keep assist) function, a collision avoidance support function, and the like.

The prediction ECU 17 predicts the behavior of each object on a road, as will be described later in detail. The prediction ECU 17 may be referred to as a prediction apparatus, a behavior prediction apparatus, or the like, or may be referred to as a processing apparatus (processor), an information processing apparatus, or the like (may also be referred to not as an apparatus but as a device, a module, a unit, or the like). When performing automated driving, the driving operation ECU 12 controls some or all of the operators 111 to 113 based on a prediction result of the prediction ECU 17.

The prediction ECU 17 has the same arrangement as the driving operation ECU 12, and includes a CPU 171, a memory 172, and a communication interface 173. The CPU 171 acquires peripheral information of the vehicle 1 from the detection unit 16 via the communication interface 173. The CPU 171 predicts the behavior of each object on a road based on the peripheral information, and stores the prediction result in the memory 172 or outputs it to the driving operation ECU 12 via the communication interface 173.

Figure 3A:
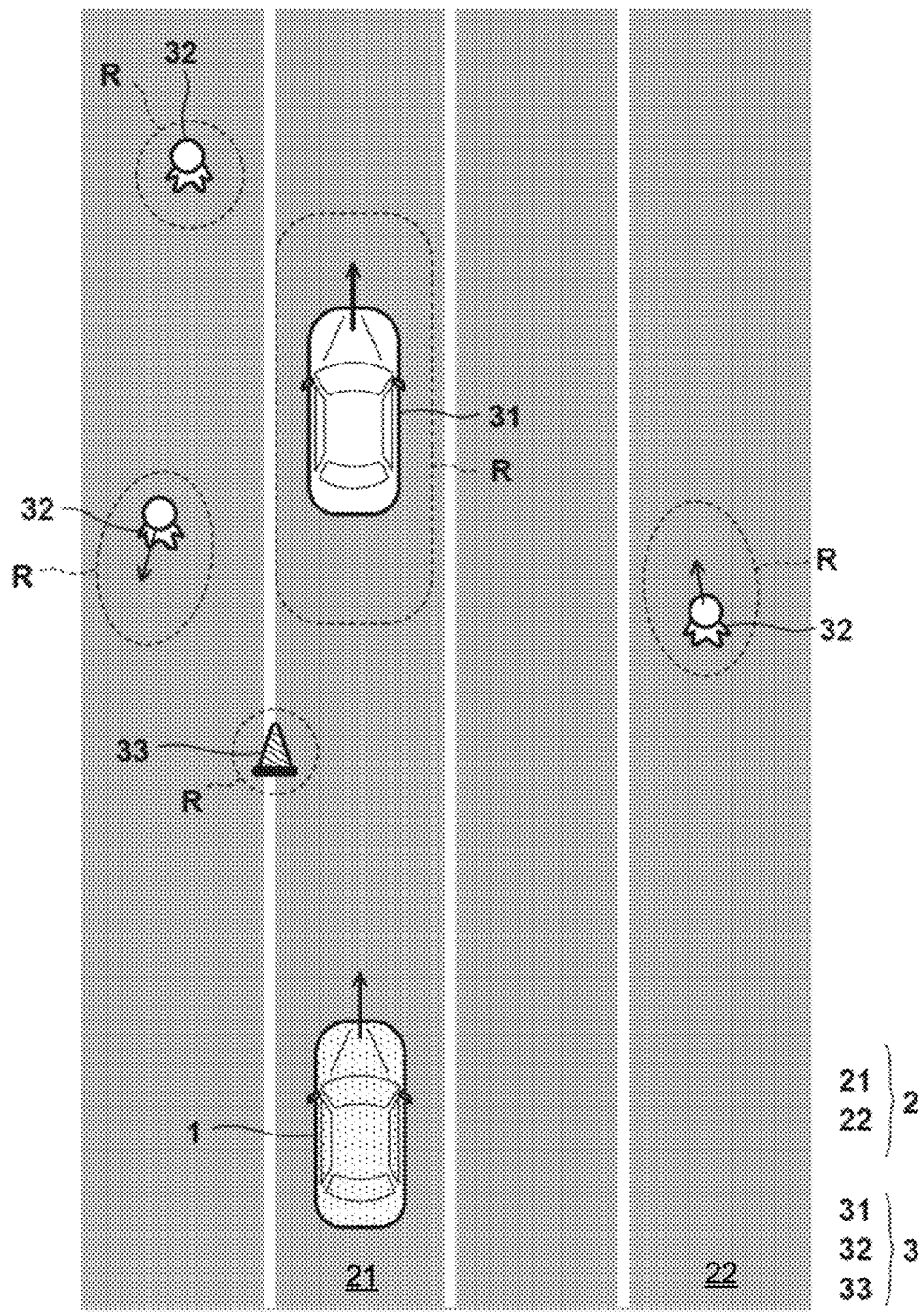
FIG. 3A is a view for explaining an example of a method of setting a warning region for each object on a road.

FIG. 3A is a plan view showing a state in which the vehicle 1 and a plurality of objects 3 exist on a road 2, and shows a state in which the vehicle 1 (to be referred to as a "self-vehicle 1" hereinafter for the sake of discrimination) is traveling on a roadway 21 by automated driving. The self-vehicle 1 detects the objects 3 on the roadway 21 and sidewalks 22 by the detection unit 16, and sets a traveling route so as to avoid the objects, thereby performing automated driving. Here, examples of the objects 3 are another vehicle 31, persons 32 (for example, walkers), and an obstacle 33. Note that as for each object 3 with an arrow, the arrow indicates the traveling direction of the object 3.

Note that a road cone is illustrated here as the obstacle 33. However, the obstacle is not limited to this example as long as it is an object that physically interrupts traveling. The obstacle may be, for example, a fallen object such as garbage, may be an installed object such as a traffic signal or a guard fence, and may be either movable or immovable.

As shown in FIG. 3A, if the plurality of objects 3 are confirmed from the detection result (peripheral information of the vehicle 1) of the detection unit 16, the prediction ECU 17 sets a warning region R for each object 3. The warning region R is a region used to avoid contact of the self-vehicle 1, that is, a region recommended not to overlap the self-vehicle 1. The warning region R for a given object 3 is set, as a region in which the object 3 can move within a predetermined period, such that it has a predetermined width outside the outline of the object 3. The warning region R is set (changed, updated, or reset: to be simply referred to as "set" hereinafter) periodically, for example, every 10 [msec].

Note that the warning region R is represented here by a plane (two dimensions) to facilitate the explanation. In fact, the warning region R is set in accordance with a space detected by the onboard detection unit 16. For this reason, the warning region R can be expressed by three-dimensional space coordinates or can be expressed by four-dimensional space coordinates including the time base.

The prediction ECU 17 sets the warning region R for, for example, the other vehicle 31 traveling in front of the self-vehicle 1 outside the outline of the other vehicle 31. The width (the distance from the outline) of the warning region R can be set based on the information of the other vehicle 31 (for example, position information such as the position relative to the self-vehicle 1 and the distance from the self-vehicle 1 and state information such as the traveling direction and the vehicle speed of the other vehicle 31) so as to be different from each other on the front side, the lateral sides, and the rear side. When the other vehicle 31 is traveling in a straight line, the prediction ECU 17 sets the warning region R such that it has a predetermined width (for example, about 50 cm) on each lateral side of the vehicle body and a relatively large width (a width according to the vehicle speed of the other vehicle 31) on the front and rear sides of the vehicle body. When the other vehicle 31 makes a left turn (or a right turn), the prediction ECU 17 increases the width on the left side (or the right side) of the warning region R. When the other vehicle 31 stops, the warning region R may be set in the same width on the front side, the lateral sides, and the rear side.

In addition, the prediction ECU 17 sets the warning region R for, for example, the person 32 on the sidewalk 22 outside the outline of the person 32 based on the information of the person 32 (for example, position information such as the position relative to the self-vehicle 1 and the distance from the self-vehicle 1 and state information such as the moving direction, the moving speed, and the line of sight of the person 32). The width of the warning region R can be set based on the information of the person 32 so as to be different from each other on the front side, the lateral sides, and the rear side. For example, the width of the warning region R is set based on the moving speed of the person 32 and/or set based on the line of sight of the person 32. When the person 32 is at a standstill, the warning region R may be set in the same width on the front side, the lateral sides, and the rear side.

Additionally, the prediction ECU 17 can also predict the age bracket of the person 32 and set the width of the warning region R based on the prediction result. This prediction is done using the outer appearance information (the information of the outer appearance of the person such as physique information and clothing information) of the person 32 based on the detection result from the detection unit 16.

Furthermore, the prediction ECU 17 sets the warning region R for, for example, the obstacle 33 on the roadway 21 outside the outline of the obstacle 33 based on the information of the obstacle 33 (for example, position information such as the position relative to the self-vehicle 1 and the distance from the self-vehicle 1 and state information such as the type, shape, and size). Since it is considered that the obstacle 33 does not move, the width of the warning region R may be set to a predetermined value. If the detection unit 16 further includes, for example, a wind velocity sensor and can detect a wind velocity, the width of the warning region R may be set based on the wind velocity.

The width of the warning region R for each object 3 may further be set based on the vehicle speed of the self-vehicle 1. When the self-vehicle 1 is traveling at a relatively high speed, for example, the width of the warning region R for the other vehicle 31 is set relatively large. This makes it possible to keep a sufficient following distance to the other vehicle 31 and avoid contact with the other vehicle 31.

Based on the prediction result from the prediction ECU 17, the driving operation ECU 12 sets a traveling route not to pass through the warning region R for each object 3, thereby preventing the self-vehicle 1 from coming into contact with each object 3.

<Automated Driving Processing>

Figure 3B:
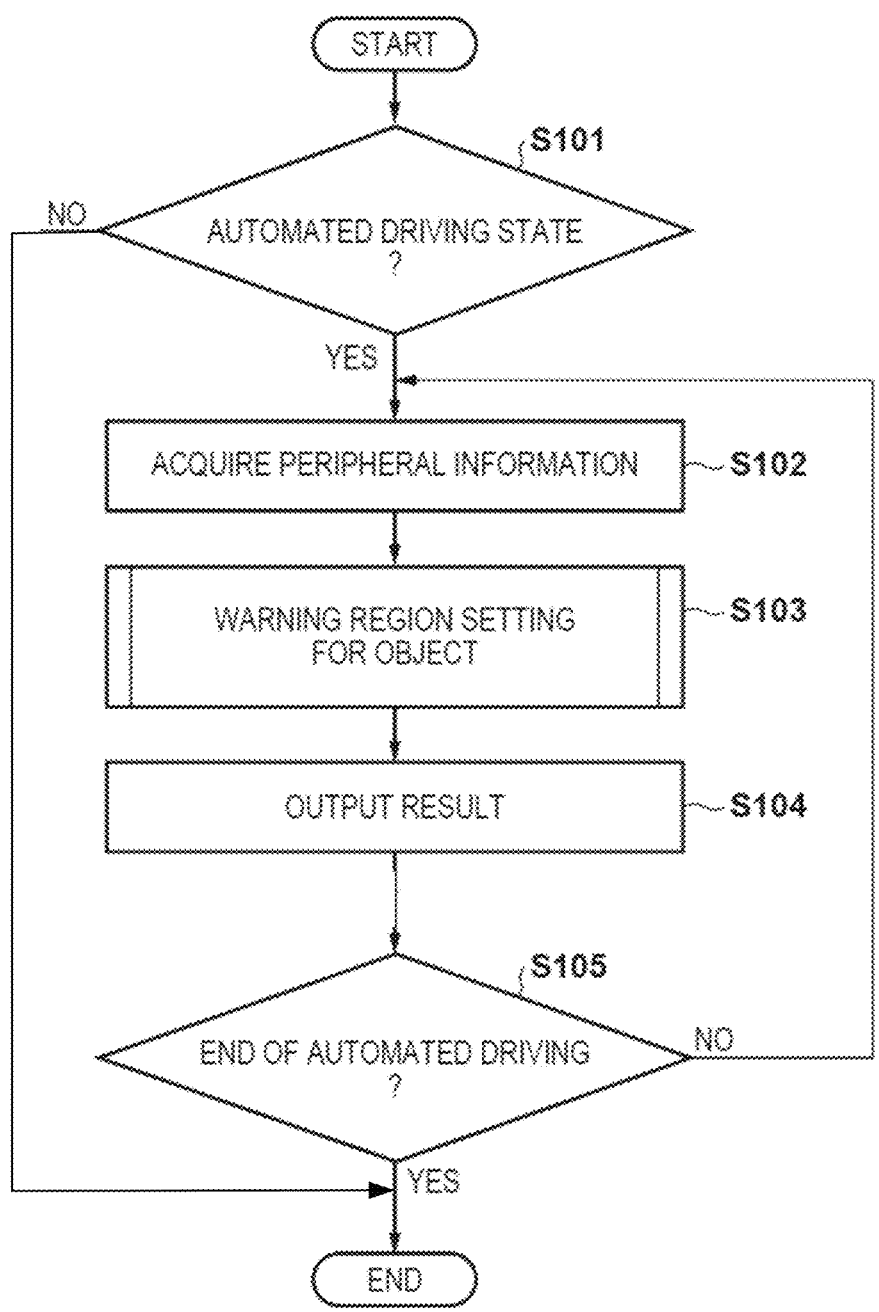
FIG. 3B is a flowchart showing an example of automated driving processing.

FIG. 3B is a flowchart showing the procedure of processing for performing automated driving according to this embodiment. The contents of the flowchart are mainly performed by the CPU 171 in the prediction ECU 17. When the self-vehicle 1 starts automated driving, the prediction ECU 17 recognizes each object 3 on the periphery of the self-vehicle 1 based on the peripheral information of the self-vehicle 1, sets the warning region R for each object 3, and outputs the result to the driving operation ECU 12.

In step S101, it is determined whether the self-vehicle 1 is in an automated driving state. This step is performed by, for example, receiving, by the prediction ECU 17, a signal representing whether the self-vehicle 1 is in the automated driving state from the driving operation ECU 12. If the self-vehicle 1 is in the automated driving state, the process advances to step S102. If the self-vehicle 1 is not in the automated driving state, the flowchart ends.

In step S102, the peripheral information of the self-vehicle 1 is acquired. This step is performed by receiving, by the prediction ECU 17, the peripheral information of the self-vehicle 1 detected by the detection unit 16.

In step S103, each object 3 existing on the periphery of the self-vehicle 1 is extracted from the peripheral information obtained in step S102, and the warning region R is set for each object 3. This step is performed by performing predetermined data processing (for example, data processing of performing outline extraction) for data representing the peripheral information. The warning region R is set for each object 3 based on the information of the extracted object 3.

For example, for the other vehicle 31, the warning region R is set based on the information (the above-described position information, state information, and the like) of the vehicle. For example, for the person 32, the warning region R is set based on the information (the above-described position information, state information, and the like) of the person. Details of the warning region setting processing will be described later.

In step S104, the information of the warning region R set in the above-described way is output to the driving operation ECU 12. The driving operation ECU 12 decides the traveling route of the self-vehicle 1 based on the information and decides the contents of the driving operation of the self-vehicle 1.

In step S105, it is determined whether to end the automated driving state of the self-vehicle 1. This step is performed by, for example, receiving, by the prediction ECU 17, a signal representing the end of the automated driving state from the driving operation ECU 12. If the automated driving state is not to be ended, the process returns to step S102. If the automated driving state is to be ended, the flowchart ends.

The series of steps S101 to S105 are repetitively performed in a period of, for example, about 10 [msec] or less. That is, acquisition of the peripheral information of the self-vehicle 1, detection of each object 3 on the periphery of the self-vehicle 1 and associated setting of the warning region R, and output of the results to the driving operation ECU 12 are periodically performed.

Note that each step of the flowchart may be changed without departing from the scope of the present invention. For example, the order of the steps may be changed, some steps may be omitted, or another step may be added.

<Description of Warning Region>

Figure 4B:
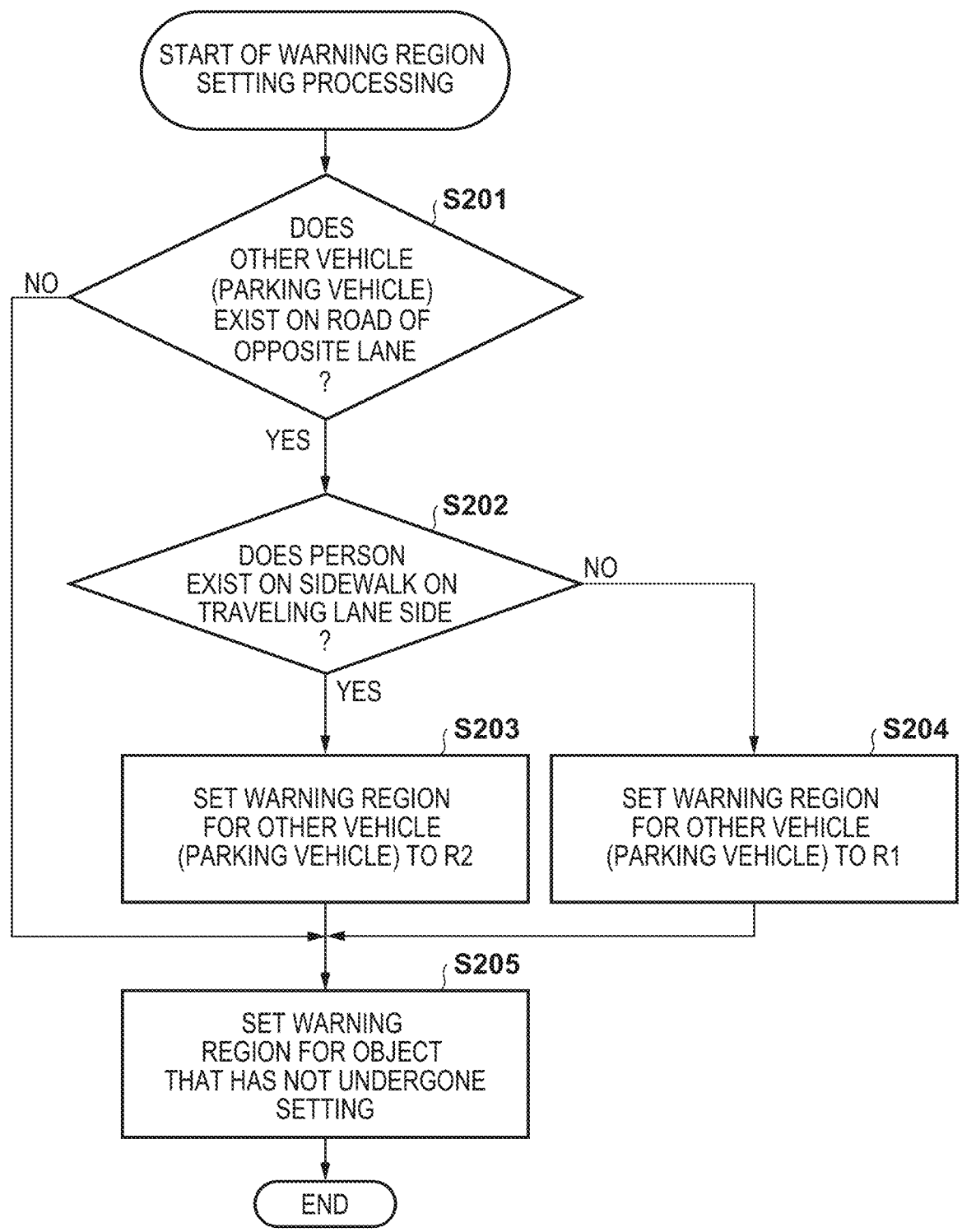
FIG. 4B is a flowchart showing an example of warning region setting processing according to the first embodiment.

The warning region setting procedure executed by the prediction ECU 17 according to this embodiment will be described next with reference to FIGS. 4A and 4B. FIG. 4A is a plan view showing a state in which the self-vehicle 1 is traveling along the roadway. The self-vehicle 1 is traveling by automated driving, and the other vehicle 31 is stopped on the opposite lane.

In 401, a warning region R1 is set for the other vehicle 31 stopped on the opposite lane. The warning region R1 is a warning region for the other vehicle that is stopped. The warning region R1 is, for example, a region within the range of a distance L1 from the outer edge of the other vehicle 31.

In 402, if the person 32 exists on the front left side of the traveling lane of the self-vehicle 1, the warning region for the other vehicle 31 stopped on the opposite lane is set to a warning region R2 wider than the warning region R1. The warning region R2 is a warning region for the other vehicle that is stopped. The warning region R2 is, for example, a region within the range of a distance L2 from the outer edge of the other vehicle 31. Note that the warning region R2 may exist within the range of the distance L2 from the outer edge of the other vehicle 31 on all of the front side, the lateral sides, and the rear side, or may exist within the range of the distance L2 from the outer edge of the self-vehicle 1 on the lateral side on the traveling lane side, the front side, and the rear side. Alternatively, the warning region R2 may exist within the range of the distance L2 from the outer edge of the self-vehicle 1 on the lateral side on the traveling lane side and within the range of the distance L1 from the outer edge on the other lateral side, the front side, and the rear side. At least the distance from the outer edge of the self-vehicle 1 on the lateral side on the traveling lane side needs to be longer than the distance L1.

In this embodiment, if the person 32 exists on the front left side of the traveling lane of the self-vehicle 1, the warning region is set assuming a possibility that another person runs out from the vicinity (for example, the blind spot behind the other vehicle 31) of the other vehicle 31 (parking vehicle) toward the person 32 across the road. That is, if the person 32 exists on the front left side of the traveling lane of the self-vehicle 1, and the other vehicle 31 is stopped on the opposite lane, the warning region for the other vehicle 31 is set to the warning region R2 wider than the warning region R1. Note that at least the width direction of each warning region for the other vehicle 31 is set to be wider as compared to the warning region for the walker 32.

<Warning Region Setting Processing>

FIG. 4B is a flowchart showing the procedure of processing of setting the warning region for the other vehicle 31 according to this embodiment. The contents of the flowchart correspond to details of the process of step S103 and are mainly performed by the CPU 171 in the prediction ECU 17.

In step S201, it is determined whether the other vehicle 31 exists among the objects 3 extracted based on the peripheral information acquired in step S102. If the other vehicle 31 exists, it is determined whether the other vehicle 31 that is stopped exists on the road of the opposite lane of the traveling lane of the self-vehicle 1. This step is performed by, for example, pattern matching based on the outer appearance information or the like of the object 3 of the determination target. If the other vehicle 31 that is stopped exists on the road of the opposite lane, the process advances to step S202. Otherwise, the process advances to step S205.

In step S202, it is determined whether the person 32 exists among the objects 3 extracted based on the peripheral information acquired in step S102. If the person 32 exists, it is determined whether the person 32 exists on the sidewalk on the side of the traveling lane of the self-vehicle 1. This step is performed by, for example, pattern matching based on the outer appearance information or the like of the object 3 of the determination target. If the person 32 exists on the sidewalk on the side of the traveling lane of the self-vehicle 1, the process advances to step S203. Otherwise, the process advances to step S204.

In step S203, the warning region R for the other vehicle 31 is set to the warning region R2 shown in 402 of FIG. 4A. That is, the warning region for the other vehicle 31 is set wide. This is because if the person 32 exists on the front left side of the traveling lane of the self-vehicle 1, there is a possibility that another person runs out from the vicinity (for example, the blind spot behind the other vehicle 31) of the other vehicle 31 (parking vehicle) toward the person 32 across the road, as described above.

In step S204, the warning region R for the other vehicle 31 is set to the warning region R1 shown in 401 of FIG. 4A. That is, the warning region for the other vehicle 31 is set narrow. This is because if the person 32 does not exist on the front left side of the traveling lane of the self-vehicle 1, it is considered that a possibility that another person runs out from the vicinity (for example, the blind spot behind the other vehicle 31) of the other vehicle 31 (parking vehicle) across the road is low.

In step S205, a predetermined warning region is set for each object that has not undergone the warning region setting yet in the objects 3 extracted based on the peripheral information acquired in step S102. For example, warning regions are set for objects such as the other vehicle 31 that is not stopped, the person 32, a curb, and a guardrail, which have not undergone the warning region setting yet. For example, if the person 32 is included in the extracted objects 3, the warning region R is set for the person 32 based on the information (the above-described position information, state information, and the like) of the person. The series of processes shown in FIG. 4B thus ends.

Note that each step of the flowchart may be changed without departing from the scope of the present invention. For example, the order of the steps may be changed, some steps may be omitted, or another step may be added.

[Modification]

In this embodiment, an example in which if the person 32 exists on the front left side of the traveling lane of the self-vehicle 1, and the other vehicle 31 exists on the opposite lane, the warning region for the other vehicle 31 is set to the warning region R2 wider than the warning region R1 has been described.

In addition, the behavior (the line of sight, the direction of the body, the presence/absence of a signal, or the like) of the person 32 may be further detected, and when a predetermined behavior is detected, the warning region may be set to the warning region R2. For example, upon further detecting that the person 32 existing on the front left side of the traveling lane of the self-vehicle 1 is looking at (for example, is directing the line of sight, the face or the body to) the side of the other vehicle 31 (the opposite lane side), the warning region for the other vehicle 31 may be set to the warning region R2.

Alternatively, upon further detecting that the person 32 existing on the front left side of the traveling lane of the self-vehicle 1 is sending a signal (raising a hand, waving, or the like) to the side of the other vehicle 31 (the opposite lane side), the warning region for the other vehicle 31 may be set to the warning region R2.

If another person who has some relationship with the person 32 exists in the vicinity of the other vehicle 31 that is stopped, the person 32 is assumed to turn to the person or give a signal to the person. For example, a case in which the person 32 urges the other person to come to the place where the person 32 exists can be considered. In this case, there is a possibility that the other person moves toward the person 32 across the road. Hence, upon further detecting that the person 32 turns to the side of the other vehicle 31 (where the other person probably exists) or is sending a signal, the warning region for the other vehicle 31 is set to the warning region R2.

In addition, if the person 32 exists on the front left side of the traveling lane of the self-vehicle 1, the other vehicle 31 is stopped on the opposite lane on the front right side of the traveling lane of the self-vehicle 1, and the person 32 and the other vehicle 31 are located to overlap in the road width direction, the warning region for the other vehicle 31 may be set to the warning region R2. This is, for example, a case in which the person 32 exists in the range where a straight line extended from the position of the person 32 in the road width direction overlaps the other vehicle 31. Alternatively, if the distance between the other vehicle 31 and the person 32 is a predetermined value or less, the warning region for the other vehicle 31 may be set to the warning region R2. This is because in a case in which the distance between the person 32 and the other vehicle 31 is long, even if another person exists in the vicinity of the other vehicle 31, it can be considered that the person has no relationship with the person 32, and the possibility that the person moves across the road is not high.

Furthermore, it may be further determined based on peripheral information whether at least one of a sidewalk, a curb, and a guardrail exists, and warning region setting processing may be performed using the determination result as well. For example, if another vehicle that is stopped exists on one side of a road in the width direction, a walker exists on the other side of the road in the width direction, and at least one of a sidewalk, a curb, and a guardrail exists, the warning region R2 may be set for the other vehicle. Since warning region setting processing can be performed under an environment in which the possibility of occurrence of run-out is higher, the warning region setting accuracy can be improved.

Note that in this embodiment, the description has been made using a road formed from one traveling lane and one opposite lane as an example. However, the number of lanes is not limited.

As described above, in this embodiment, if the person 32 exists on the front left side of the traveling lane of the self-vehicle 1, and the other vehicle 31 is stopped on the opposite lane based on the peripheral information of the self-vehicle 1 obtained by the detection unit 16, the prediction ECU 17 sets the warning region for the other vehicle 31 to the warning region R2 wider than the warning region R1 in a case in which the person 32 is absent.

More specifically, the processing apparatus (for example, the prediction ECU 17) according to this embodiment acquires the peripheral information of the self-vehicle (for example, the self-vehicle 1), determines based on the peripheral information whether another vehicle (for example, the other vehicle 31) that is stopped exists on one side of a road in a width direction, determines whether a walker (for example, the walker 32) exists on the other side of the road in the width direction, and if the other vehicle that is stopped exists on one side of the road in the width direction, and a walker exists on the other side of the road in the width direction, sets, for the other vehicle, a second warning region (for example, the warning region R2) wider than a first warning region (for example, the warning region R1) in a case in which the other vehicle that is stopped exists on one side of the road in the width direction, and a walker does not exist on the other side of the road in the width direction.

According to this embodiment, it is possible to implement safer automated driving assuming a possibility that a person runs out from the vicinity (particularly the rear side of the other vehicle 31 as a blind spot) of the other vehicle 31 stopped on the opposite lane and moves across the road.

Second Embodiment

In the first embodiment, an example in which if the person 32 exists on the front left side of the traveling lane of the self-vehicle 1, and the other vehicle 31 is stopped on the opposite lane, the warning region for the other vehicle 31 is set to the warning region R2 wider than the warning region R1 in a case in which the person 32 is absent has been described. On the other hand, in the second embodiment, an example will be described, in which when parallel parking is done (when a plurality of other vehicles are stopped) on the opposite lane, a warning region for the other vehicles 31 that are stopped is set wider than a warning region in a case in which a person 32 is absent.

<Description of Warning Region>

Figure 5B:
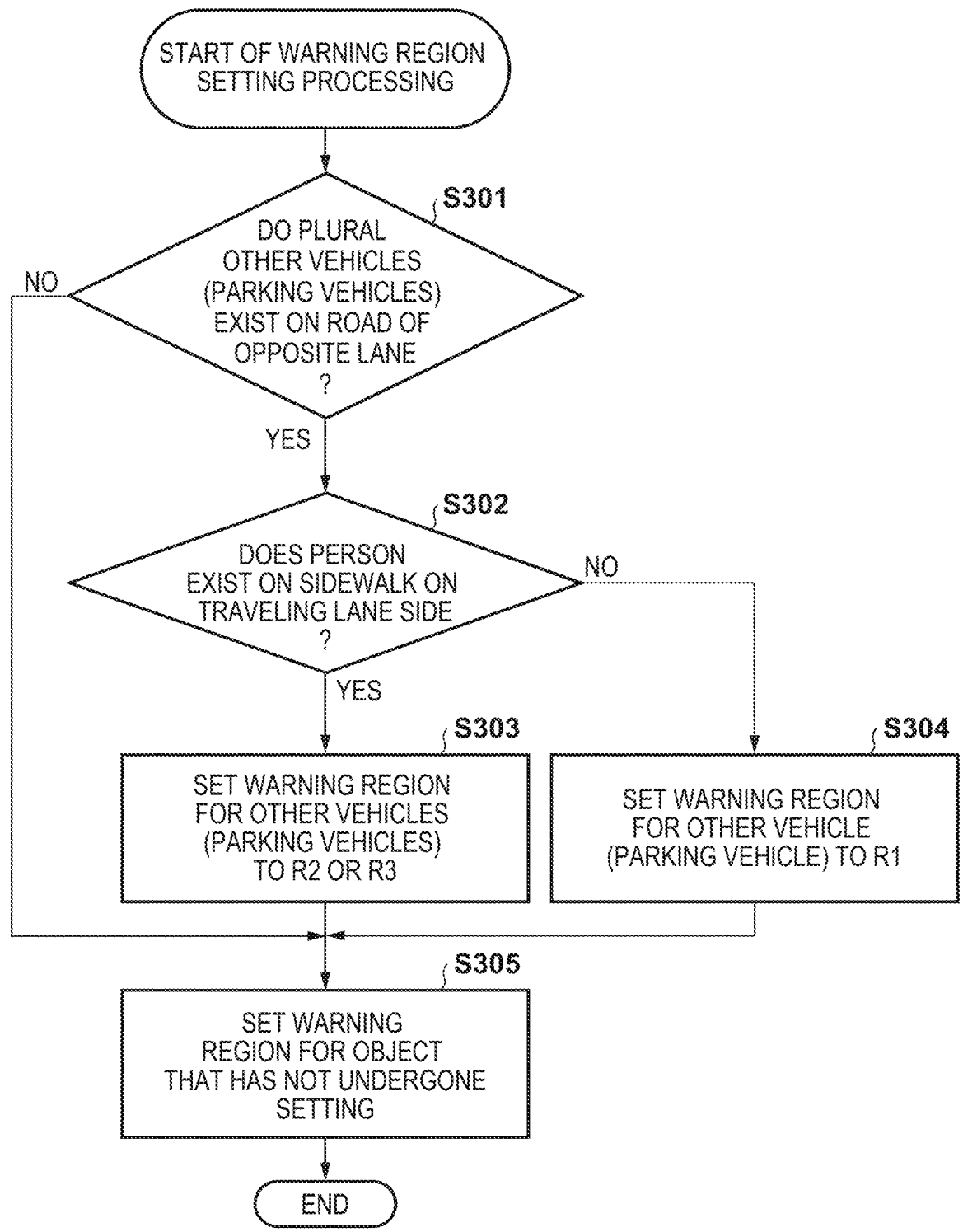
FIG. 5B is a flowchart showing an example of warning region setting processing according to the second embodiment.

Processing executed by a prediction ECU 17 that is a prediction apparatus according to this embodiment will be described with reference to FIGS. 5A and 5B. FIG. 5A is a plan view showing a state in which a self-vehicle 1 is traveling along a roadway. The self-vehicle 1 is traveling by automated driving, and a plurality of other vehicles 31 are stopped (parallel parking) on the opposite lane.

In 501, a warning region R2 is set for each of the other vehicles 31 stopped on the opposite lane. The warning region R2 here is the same as the warning region R2 described in the first embodiment. If parallel parking is done on the opposite lane, there is a possibility that another person runs out from the gap between the other vehicles. Hence, the warning region for each of the plurality of other vehicles 31 that are stopped is set to the warning region R2 wider than a warning region R1.

Alternatively, as shown in 502, the warning region for each of the plurality of other vehicles 31 that are stopped may be set to a warning region R3 wider than the warning region R2. The warning region R3 is a region obtained by further expanding a region of the warning region R2 near the gap between the vehicles to the side of the traveling lane of the self-vehicle 1. That is, the warning region R3 is a region wider to the other side of the road in the width direction than the warning region R2 between the plurality of other vehicles 31. In the example shown in FIG. 5A, the warning region R3 is a region within the range of a distance L3 (>distance L2) from the extension of the right-side outer edges of the other vehicles 31 between the plurality of other vehicles 31. This region has the distance L3 at the intermediate point between the vehicles, and the distance smoothly approaches the distance L2 from the intermediate point. Note that the method of setting the warning region R3 is not limited to the illustrated example, and the warning region R3 may be set within the range of the distance L3 from the outer edges of the other vehicle 31 on all of the front side, the lateral sides, and the rear side. Alternatively, the warning region R3 may be set within the range of the distance L3 from the outer edges of the other vehicle 31 on the right side, the front side, and the rear side. The warning region R3 may be set within the range of the distance L3 from the outer edge of the other vehicle 31 on the right side.

Since this makes it possible to set a wide warning region near the gap between vehicles where abrupt run-out may occur, safer automated driving can be implementing by avoiding the warning region. Note that the method of setting the warning region R3 is not limited to the illustrated example, and any shape can be employed as long as the warning region near the gap between the vehicles further spreads to the side of the traveling lane of the self-vehicle 1.

<Warning Region Setting Processing>

FIG. 5B is a flowchart showing the procedure of processing of setting the warning region for the other vehicle 31 according to this embodiment. The contents of the flowchart correspond to details of the process of step S103 and are mainly performed by a CPU 171 in the prediction ECU 17. A description will be made below with reference to FIG. 5A as well. Note that the processes of steps S302, S304, and S305 in FIG. 5B are the same as the processes of steps S202, S204, and S205 explained with reference to FIG. 4B, and a detailed description thereof will be omitted.

In step S301, it is determined whether the other vehicle 31 exists among objects 3 extracted based on peripheral information acquired in step S102. If the other vehicle 31 exists, it is determined whether a plurality of other vehicles 31 that are stopped exist on the road of the opposite lane of the traveling lane of the self-vehicle 1. This step is performed by, for example, pattern matching based on the outer appearance information or the like of the object 3 of the determination target. If a plurality of other vehicles 31 that are stopped exist on the road of the opposite lane, the process advances to step S302. Otherwise, the process advances to step S305.

In step S303, the warning region R for the other vehicles 31 is set to the warning region R2 shown in 501 of FIG. 5A or the warning region R3 shown in 502. That is, the warning region for the other vehicles 31 is set wide. The wider warning region R2 is set because if the person 32 exists on the front left side of the traveling lane of the self-vehicle 1, there is a possibility that another person runs out from the gap between the other vehicles 31 (parking vehicles) toward the person 32 across the road, as described above. In addition, when the warning region R3 wider than the warning region R2 to the other side of the road in the width direction between the plurality of other vehicles is set for each vehicle, the warning level can be raised in the region where run-out may occur, and safer automated driving can be implemented. FIG. 5B has been described above.

Note that each step of the flowchart may be changed without departing from the scope of the present invention. For example, the order of the steps may be changed, some steps may be omitted, or another step may be added.

As described above, in this embodiment, if the person 32 exists on the front left side of the traveling lane of the self-vehicle 1, and the plurality of other vehicles 31 are stopped on the opposite lane (parallel parking occurs) based on the peripheral information of the self-vehicle 1 obtained by the detection unit 16, the prediction ECU 17 sets the warning region for the other vehicles 31 to the warning region R2 or R3 wider than the warning region R1 in a case in which the person 32 is absent. According to this embodiment, it is possible to implement safer automated driving assuming a possibility that another person runs out from the gap between the other vehicles 31 stopped on the opposite lane and moves across the road.

Note that as in the modification of the first embodiment, the behavior (the line of sight, the direction of the body, the presence/absence of a signal, or the like) of the person 32 may be further detected, and processing combined with the detection result may be performed.

Third Embodiment

In the second embodiment, an example in which if the person 32 exists on the front left side of the traveling lane of the self-vehicle 1, and the plurality of other vehicles 31 are stopped on the opposite lane, the warning region for the other vehicles 31 is set to the warning region R2 or R3 wider than the warning region R1 in a case in which the person 32 is absent has been described. On the other hand, in the third embodiment, an example will be described, in which when parallel parking is done on the opposite lane, and a time elapsed from the stop of other vehicles 31 is a predetermined time or less, a warning region for the other vehicles 31 is set to a warning region R4. Here, the warning region R4 is a region wider than a warning region R1 and narrower than warning regions R2 and R3. Since it is considered that a possibility that a person runs out to the road from the vicinity of the other vehicle 31 that has just stopped is not high, the warning region R4 narrower than the warning regions R2 and R3 is set.

<Description of Warning Region>

Figure 6B:
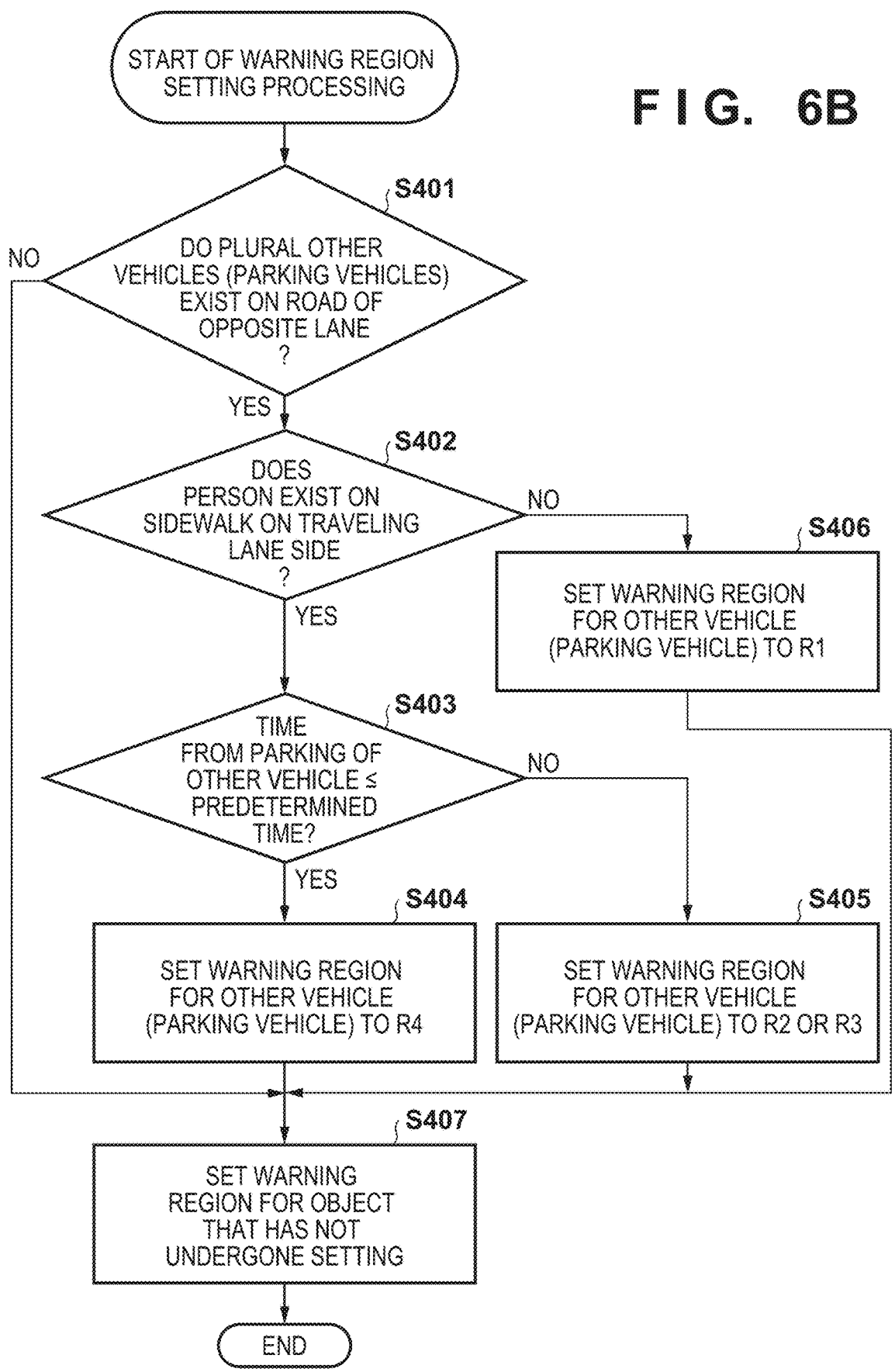
FIG. 6B is a flowchart showing an example of warning region setting processing according to the third embodiment.

Processing executed by a prediction ECU 17 that is a prediction apparatus according to this embodiment will be described with reference to FIGS. 6A and 6B. FIG. 6A is a plan view showing a state in which an self-vehicle 1 is traveling along a roadway. The self-vehicle 1 is traveling by automated driving, and a plurality of other vehicles 31 are stopped (parallel parking) on the opposite lane. In 601, the warning region R2 is set for each of the other vehicles 31, as described in the second embodiment. On the other hand, 602 shows an example in a case in which the time elapsed from the stop of another following vehicle 31a on the opposite lane is a predetermined time or less, whereas the time elapsed from the stop of the other vehicle 31b on the front side in the traveling direction on the opposite lane exceeds the predetermined time. The warning region for the other vehicle 31a that has just stopped is set to the warning region R4 narrower than the warning region R2. The warning region for the other vehicle 31b stopped for a long time is set to the warning region R2. In the example shown in FIG. 6A, the warning region R4 is a region within the range of a distance L4 (<distance L2) from the right-side outer edge of the other vehicle 31a. Note that the method of setting the warning region R4 is not limited to the illustrated example, and the warning region R4 may be set within the range of the distance L4 from the outer edges of the other vehicle 31a on all of the front side, the lateral sides, and the rear side. Alternatively, the warning region R4 may be set within the range of the distance L4 from the outer edges of the other vehicle 31a on the right side, the front side, and the rear side. However, the warning region R4 is a region wider than the warning region R1. It is therefore possible to prevent the traveling enable position of the self-vehicle 1 from being narrowed more than necessary.

<Warning Region Setting Processing>

FIG. 6B is a flowchart showing the procedure of processing of setting the warning region for the other vehicle 31 according to this embodiment. The contents of the flowchart correspond to details of the process of step S103 and are mainly performed by a CPU 171 in the prediction ECU 17. A description will be made below with reference to FIG. 6A as well. Note that the processes of steps S401, S402, and S405 to S407 in FIG. 6B are the same as the processes of steps S301 to S305 explained with reference to FIG. 5B, and a detailed description thereof will be omitted.

In step S403, it is determined whether the time elapsed from the stop of each of the other vehicles 31 is a predetermined time or less. This step is performed by determining whether the other vehicle 31 is moving or stopped based on a result of sequential reception, by the prediction ECU 17, of the peripheral information of the self-vehicle 1 detected by a detection unit 16 and determining whether the time elapsed from the stop is the predetermined time or less. As the predetermined time, an arbitrary value may be set, or a value set in advance may be used. Upon determining that the time elapsed from the parking of the other vehicle is the predetermined time or less, the process advances to step S404. On the other hand, upon determining that the time elapsed from the parking of the other vehicle exceeds the predetermined time, the process advances to step S405.

In step S404, the warning region R for the other vehicles 31 is set to the warning region R4 shown in 602 of FIG. 6A. That is, the warning region for the other vehicles 31 is set to be wider than the warning region R1 and narrower than the warning region R2 or R3. This is because if a person 32 exists on the front left side of the traveling lane of the self-vehicle 1, there is a possibility that another person runs out from the gap between the other vehicles 31 (parking vehicles) toward the person 32 across the road, as described above. In addition, since the predetermined time has not elapsed from the parking, it can be considered that the possibility of run-out is low.

Step S405 is the same process as step S303, and the warning region R for the other vehicles 31 is set to the warning region R2 or R3. That is, the warning region for the other vehicles 31 is set wide. This is because if the person 32 exists on the front left side of the traveling lane of the self-vehicle 1, there is a possibility that another person runs out from the gap between the other vehicles 31 (parking vehicles) toward the person 32 across the road, as described above. In addition, since the predetermined time has elapsed from the parking, it can be considered that the possibility of run-out is high. FIG. 6B has been described above.

Note that each step of the flowchart may be changed without departing from the scope of the present invention. For example, the order of the steps may be changed, some steps may be omitted, or another step may be added.

As described above, in this embodiment, if parallel parking is done on the opposite lane, and the time elapsed from the stop of the other vehicle 31 that is stopped is a predetermined time or less, the warning region for the other vehicle 31 is set to the warning region R4 that is wider than the warning region R1 and narrower than the warning regions R2 and R3. According to this embodiment, since it is considered that a possibility that a person runs out to the road from the vicinity of the other vehicle 31 that has just stopped is not high, the warning region R4 narrower than the warning regions R2 and R3 is set, thereby preventing the traveling enable position of the self-vehicle 1 from being narrowed more than necessary.

Note that as in the first embodiment, the behavior (the line of sight, the direction of the body, the presence/absence of a signal, or the like) of the person 32 may be further detected, and processing combined with the detection result may be performed. Additionally, in this embodiment, a case in which parallel parking is done has been described as an example. However, the present invention is not limited to parallel parking. For example, the present invention is also applicable to a case in which one vehicle is stopped on the opposite lane, as in the first embodiment.

Fourth Embodiment

In the second embodiment, an example in which if the person 32 exists on the front left side of the traveling lane of the self-vehicle 1, and the plurality of other vehicles 31 are stopped on the opposite lane, the warning region for the other vehicles 31 is set to the warning region R2 or R3 wider than the warning region R1 in a case in which the person 32 is absent has been described. On the other hand, in the fourth embodiment, an example will be described, in which when parallel parking is done on the opposite lane, and the interval between other vehicles 31 that are stopped is a predetermined value or more, a warning region for the other vehicles 31 is set to a warning region R5. Here, the warning region R5 is a region wider than a warning region R1 and narrower than warning regions R2 and R3. If the vehicle interval is large, a person can be recognized without forming a blind spot. Hence, the warning region R5 narrower than the warning regions R2 and R3 is set.

<Description of Warning Region>

Figure 7B:
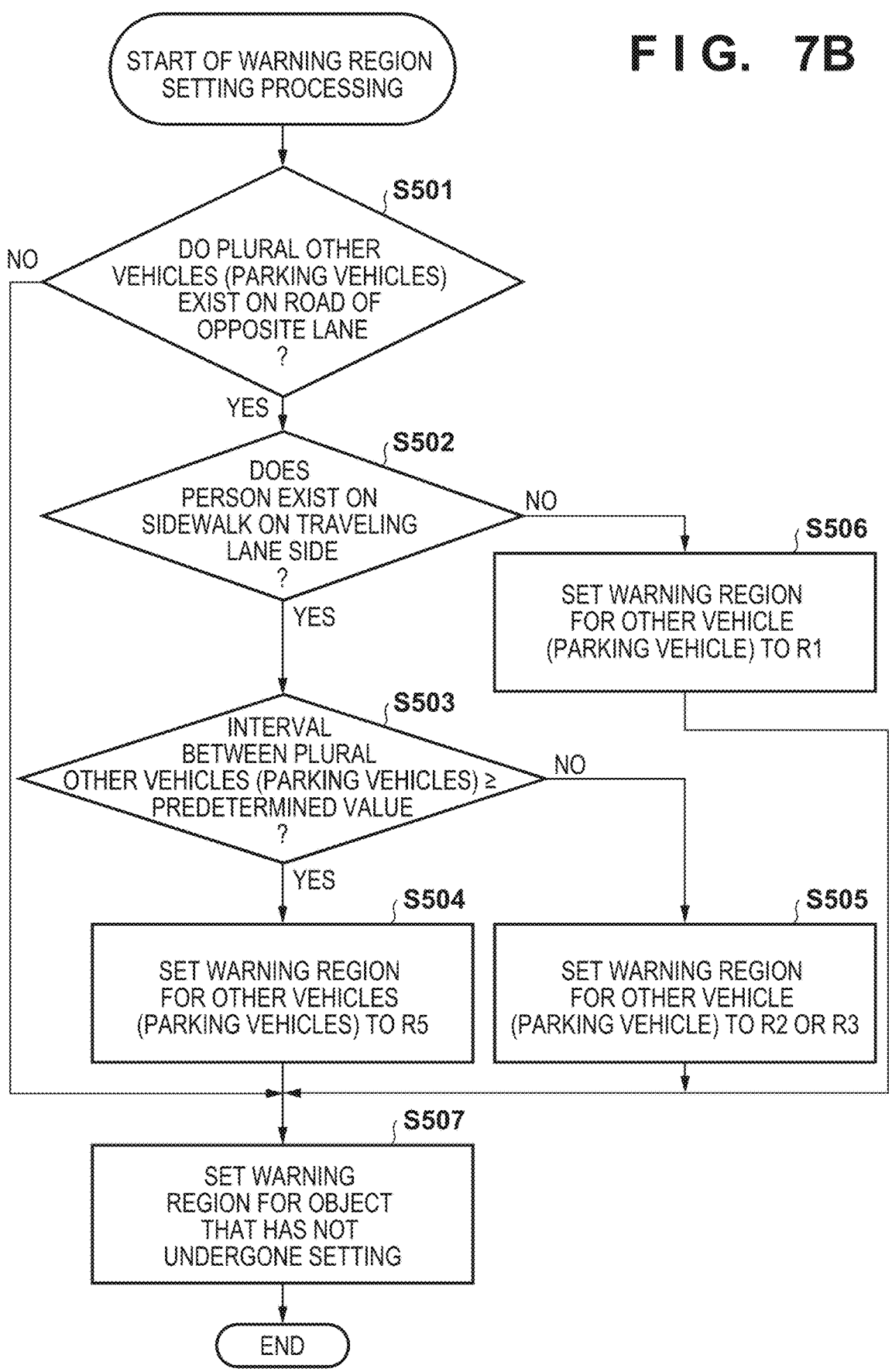
FIG. 7B is a flowchart showing an example of warning region setting processing according to the fourth embodiment.

Processing executed by a prediction ECU 17 that is a prediction apparatus according to this embodiment will be described with reference to FIGS. 7A and 7B. FIG. 7A is a plan view showing a state in which a self-vehicle 1 is traveling along a roadway. The self-vehicle 1 is traveling by automated driving, and a plurality of other vehicles 31 are stopped (parallel parking) on the opposite lane. 701 shows an example in a case in which the interval between the vehicles is H1 that is smaller than a predetermined value, and the warning region R2 is set for each of the other vehicles 31, as described in the second embodiment. On the other hand, 702 shows an example in a case in which the interval between the vehicles is H2 that is a predetermined value or more, and the warning region R5 narrower than the warning region R2 is set for each of the other vehicles 31.

In the example shown in FIG. 7A, the warning region R5 is a region within the range of a distance L5 (<distance L2) from the right-side outer edge of the other vehicle 31. Note that the method of setting the warning region R5 is not limited to the illustrated example, and the warning region R5 may be set within the range of the distance L5 from the outer edges of the other vehicle 31 on all of the front side, the lateral sides, and the rear side. Alternatively, the warning region R5 may be set within the range of the distance L5 from the outer edges of the other vehicle 31 on the right side, the front side, and the rear side. However, the warning region R5 is a region wider than the warning region R1. It is therefore possible to prevent the traveling enable position of the self-vehicle 1 from being narrowed more than necessary in a case in which the vehicle interval is so large that a person can be recognized.

<Warning Region Setting Processing>

FIG. 7B is a flowchart showing the procedure of processing of setting the warning region for the other vehicle 31 according to this embodiment. The contents of the flowchart are mainly performed by a CPU 171 in the prediction ECU 17. A description will be made below with reference to FIG. 7A as well. Note that the processes of steps S501, S502, and S505 to S507 in FIG. 7B are the same as the processes of steps S301 to S305 explained with reference to FIG. 5B, and a detailed description thereof will be omitted.

In step S503, it is determined whether the interval between the plurality of other vehicles 31 is a predetermined value or more. This step is performed by calculating the distance between the other vehicles 31 based on a result of reception, by the prediction ECU 17, of the peripheral information of the self-vehicle 1 detected by a detection unit 16 and determining whether the distance is a predetermined value or more. As the predetermined value, an arbitrary value may be set, or a value set in advance may be used. Upon determining that the interval between the plurality of other vehicles is the predetermined value or more, the process advances to step S504. On the other hand, upon determining that the interval between the plurality of other vehicles is less than the predetermined value, the process advances to step S505.

In step S504, the warning region R for the other vehicles 31 is set to the warning region R5 shown in 702 of FIG. 7A. That is, the warning region for the other vehicles 31 is set to be wider than the warning region R1 and narrower than the warning region R2 or R3. It is therefore possible to prevent the traveling enable position of the self-vehicle 1 from being narrowed more than necessary even in a case in which the vehicle interval is so large that a person can be recognized. FIG. 7B has been described above.

Note that each step of the flowchart may be changed without departing from the scope of the present invention. For example, the order of the steps may be changed, some steps may be omitted, or another step may be added.

As described above, in this embodiment, if parallel parking is done on the opposite lane, the interval between the other vehicles 31 that are stopped is calculated. If the interval is a predetermined value or more, the warning region for the other vehicles 31 is set to the warning region R5 that is wider than the warning region R1 and narrower than the warning regions R2 and R3. According to this embodiment, it is possible to prevent the traveling enable position of the self-vehicle 1 from being narrowed more than necessary in a case in which the vehicle interval is so large that a person can be recognized.

Note that as in the first embodiment, the behavior (the line of sight, the direction of the body, the presence/absence of a signal, or the like) of the person 32 may be further detected, and processing combined with the detection result may be performed.

Other Embodiments

Several embodiments have been described above. However, the present invention is not limited to these examples and may partially be modified without departing from the scope of the invention. For example, another element may be combined with the contents of each embodiment in accordance with the object, application purpose, and the like. Part of the contents of a certain embodiment may be combined with the contents of another embodiment. In addition, individual terms described in this specification are merely used for the purpose of explaining the present invention, and the present invention is not limited to the strict meanings of the terms and can also incorporate their equivalents.

Furthermore, a program that implements at least one function described in each embodiment is supplied to a system or an apparatus via a network or a storage medium, and at least one processor in the computer of the system or the apparatus can read out and execute the program. The present invention can be implemented by this form as well.

Summary of Embodiments

A processing apparatus (for example, 17) according to the first aspect comprises:
- an acquisition unit (for example, 171, S102) configured to acquire peripheral information of a self-vehicle (for example, 1);
- a first determination unit (for example, 171, S201) configured to determine, based on the peripheral information, whether another vehicle (for example, 31) that is stopped exists on one side of a road in a width direction;
- a second determination unit (for example, 171, S202) configured to determine, based on the peripheral information, whether a walker (for example, 32) exists on the other side of the road in the width direction; and
- a setting unit (for example, 171, S203) configured to, if the other vehicle that is stopped exists on the one side of the road in the width direction, and the walker exists on the other side of the road in the width direction, set, for the other vehicle, a second warning region (for example, R2) wider than a first warning region (for example, R1) in a case in which the other vehicle that is stopped exists on the one side of the road in the width direction, and the walker does not exist on the other side of the road in the width direction.

According to the first aspect, it is possible to implement safer automated driving assuming a possibility that another person runs out from the vicinity (particularly the rear side of the other vehicle 31 as a blind spot) of the other vehicle 31 stopped on the opposite lane and moves across the road.

In the second aspect, if a plurality of other vehicles (for example, 31) that are stopped exist on the one side of the road in the width direction, and the walker (for example, 32) exists on the other side of the road in the width direction, the setting unit sets the second warning region (for example, R2) for the plurality of other vehicles (for example, 171, S303).

According to the second aspect, it is possible to implement safer automated driving assuming a possibility that another person runs out from the gap between the other vehicles stopped on the opposite lane and moves across the road.

In the third aspect, the setting unit sets, for the plurality of other vehicles, a third warning region (for example, R3) wider to the other side of the road in the width direction than the second warning region between the plurality of other vehicles (for example, 171, S303).

According to the third aspect, it is possible to implement safer automated driving assuming a possibility that another person runs out from the gap between the other vehicles stopped on the opposite lane and moves across the road.

The processing apparatus (for example, 17) according to the fourth aspect further comprises a third determination unit (for example, 171, S403) configured to determine, based on the peripheral information, whether a time elapsed from a stop of the other vehicle that is stopped is not more than a predetermined time, and
- if the time elapsed from the stop of the other vehicle that is stopped is not more than the predetermined time, the setting unit sets a fourth warning region (for example, R4) narrower than the second warning region (for example, R2) for the other vehicle.

According to the fourth aspect, since it is considered that a possibility that a person runs out to the road from the vicinity of the other vehicle that has just stopped is not high, the warning region R4 narrower than the warning regions R2 and R3 is set, thereby preventing the traveling enable position of the self-vehicle 1 from being narrowed more than necessary.

The processing apparatus (for example, 17) according to the fifth aspect further comprises a fourth determination unit (for example, 171, S503) configured to determine, based on the peripheral information, whether an interval between the plurality of other vehicles that are stopped is not less than a predetermined value, and
- if the interval is not less than the predetermined value, the setting unit sets a fifth warning region (for example, R5) narrower than the second warning region (for example, R2) for the plurality of other vehicles (for example, 171, S504).

According to the fifth aspect, it is possible to prevent the traveling enable position of the self-vehicle 1 from being narrowed more than necessary even in a case in which the vehicle interval is so large that a person can be recognized.

The processing apparatus (for example, 17) according to the sixth aspect further comprises a detection unit configured to detect a behavior of the walker based on the peripheral information, and
- if the other vehicle that is stopped exists on the one side of the road in the width direction, the walker exists on the other side of the road in the width direction, and a predetermined behavior is detected by the detection unit, the setting unit sets the second warning region for the other vehicle (for example, the modification of the first embodiment).

According to the sixth aspect, if another person who has some relationship with the walker exists in the vicinity of the other vehicle that is stopped, it is possible to implement safer automated driving assuming that a possibility that the other person runs out and moves across the road becomes high.

In the seventh aspect, the predetermined behavior includes the walker (for example, 32) directed to the one side of the road in the width direction (for example, the modification of the first embodiment).

According to the seventh aspect, if the walker is directed to the side of the other vehicle that is stopped, it can be considered that a possibility that another person who has a relationship with the walker exists in the vicinity of the other vehicle is high. It is therefore possible to implement safer automated driving assuming a possibility that the other person runs out from the gap between the other vehicles stopped on the opposite lane and moves across the road.

In the eighth aspect, the predetermined behavior includes a predetermined signal sent by the walker (for example, 32) to the one side of the road in the width direction (for example, the modification of the first embodiment).

According to the eighth aspect, if the walker is sending a signal to the side of the other vehicle that is stopped, it can be considered that a possibility that another person who has a relationship with the walker exists in the vicinity of the other vehicle is high. It is therefore possible to implement safer automated driving assuming a possibility that the other person runs out from the gap between the other vehicles stopped on the opposite lane and moves across the road.

The processing apparatus (for example, 17) according to the ninth aspect further comprises a fifth determination unit configured to determine, based on the peripheral information, whether at least one of a sidewalk, a curb, and a guardrail exists, and if the other vehicle that is stopped exists on the one side of the road in the width direction, the walker exists on the other side of the road in the width direction, and at least one of the sidewalk, the curb, and the guardrail exists, the setting unit sets the second warning region for the other vehicle (for example, the modification of the first embodiment).

According to ninth aspect, since warning region setting processing can be performed under an environment in which the possibility of occurrence of run-out is higher, the warning region setting accuracy can be improved.

A processing apparatus (for example, 17) according to the 10th aspect comprises:

an acquisition unit (for example, 171, S102) configured to acquire peripheral information of a self-vehicle (for example, 1);

a first determination unit (for example, 171, S201) configured to determine, based on the peripheral information, whether a plurality of other vehicles (for example, 31) that are stopped exist on one side of a road in a width direction;

a second determination unit (for example, 171, S202) configured to determine, based on the peripheral information, whether a walker (for example, 32) exists on the other side of the road in the width direction; and a setting unit (for example, 171, S203) configured to, if the plurality of other vehicles that are stopped exist on the one side of the road in the width direction, and the walker exists on the other side of the road in the width direction, set, for the plurality of other vehicles, a second warning region (for example, R2) wider than a first warning region (for example, R1) in a case in which the plurality of other vehicles that are stopped exist on the one side of the road in the width direction, and the walker does not exist on the other side of the road in the width direction.

According to the 10th aspect, it is possible to implement safer automated driving assuming a possibility that another person runs out from the gap (a space in parallel parking) between the other vehicles stopped on the opposite lane and moves across the road.

A vehicle (for example, 1) according to the 11th aspect comprises a processing apparatus (for example, 17) of any one of the first to 10th aspects.

According to the 11th aspect, it is possible to implement safer automated driving by the vehicle assuming a possibility that a person runs out from the vicinity of the other vehicle 31 stopped on the opposite lane and moves across the road.

A processing method according to the 12th aspect comprises:

acquiring (for example, 171, S102) peripheral information of a self-vehicle (for example, 1);

determining (for example, 171, S201), based on the peripheral information, whether another vehicle (for example, 31) that is stopped exists on one side of a road in a width direction;

determining (for example, 171, S202), based on the peripheral information, whether a walker (for example, 32) exists on the other side of the road in the width direction; and if the other vehicle that is stopped exists on the one side of the road in the width direction, and the walker exists on the other side of the road in the width direction, setting (for example, 171, S203), for the other vehicle, a second warning region wider than a first warning region in a case in which the other vehicle that is stopped exists on the one side of the road in the width direction, and the walker does not exist on the other side of the road in the width direction.

According to the 12th aspect, it is possible to implement safer automated driving assuming a possibility that another person runs out from the vicinity (particularly the rear side of the other vehicle 31 as a blind spot) of the other vehicle 31 stopped on the opposite lane and moves across the road, as in the first aspect.

According to the 13th aspect, there is provided a storage medium storing a program that causes a computer to execute steps of a processing method of the 12th aspect.

According to the 13th aspect, it is possible to implement the processing method of the 12th aspect by a computer.

According to the present invention, it is possible to implement safer automated driving assuming run-out of a person onto a road.

This application claims the benefit of Japanese Patent Application No. 2017-108289, filed May 31, 2017 which is hereby incorporated by reference herein in its entirety.

What is claimed is:

1. A processing apparatus comprising:
at least one processor and memory operatively coupled and cooperating to function as:
an acquisition unit configured to acquire peripheral information of a self-vehicle;
a first determination unit configured to determine, based on the peripheral information, whether another vehicle that is stopped exists on one side of a road in a width direction:
a second determination unit configured to determine, based on the peripheral information, whether a walker exists on the other side of the road in the width direction;
a third determination unit configured to determine, based on the peripheral information, whether a time elapsed from a stop of the other vehicle that is stopped is not more than a predetermined time;
a setting unit configured to, if the other vehicle that is stopped exists on the one side of the road in the width direction, and the walker exists on the other side of the road in the width direction, set, for the other vehicle, a second warning region wider than a first warning region in a case in which the other vehicle that is stopped exists on the one side of the road in the width direction, and the walker does not exist on the other side of the road in the width direction, wherein if the time elapsed from the stop of the other vehicle that is stopped is not more than the predetermined time, the setting unit sets a fourth warning region narrower than the second warning region for the other vehicle; and a control unit configured to control the self-vehicle such that the self-vehicle avoids a warning region set by the setting unit.

2. The apparatus according to claim 1, wherein if a plurality of other vehicles that are stopped exist on the one side of the road in the width direction, and the walker exists on the other side of the road in the width direction, the setting unit sets the second warning region for the plurality of other vehicles.

3. The apparatus according to claim 2, wherein the setting unit sets, for the plurality of other vehicles, a third warning region wider to the other side of the road in the width direction than the second warning region between the plurality of other vehicles.

4. The apparatus according to claim 2, wherein the at least one processor and memory further cooperate to function as a fourth determination unit configured to determine, based on the peripheral information, whether an interval between the plurality of other vehicles that are stopped is not less than a predetermined value, wherein if the interval is not less than the predetermined value, the setting unit sets a fifth warning region narrower than the second warning region for the plurality of other vehicles.

5. The apparatus according to claim 1, wherein the at least one processor and memory further cooperate to function as a detection unit configured to detect a behavior of the walker based on the peripheral information, wherein if the other vehicle that is stopped exists on the one side of the road in the width direction, the walker exists on the other side of the road in the width direction, and a predetermined behavior is detected by the detection unit, the setting unit sets the second warning region for the other vehicle.

6. The apparatus according to claim 5, wherein the predetermined behavior includes the walker directed to the one side of the road in the width direction.

7. The apparatus according to claim 5, wherein the predetermined behavior includes a predetermined signal sent by the walker to the one side of the road in the width direction.

8. The apparatus according to claim 1, wherein the at least one processor and memory further cooperate to function as a fifth determination unit configured to determine, based on the peripheral information, whether at least one of a sidewalk, a curb, and a guardrail exists, wherein if the other vehicle that is stopped exists on the one side of the road in the width direction, the walker exists on the other side of the road in the width direction, and at least one of the sidewalk, the curb, and the guardrail exists, the setting unit sets the second warning region for the other vehicle.

9. A processing apparatus comprising:
at least one processor and memory operatively coupled and cooperating to function as:
an acquisition unit configured to acquire peripheral information of a self-vehicle;
a first determination unit configured to determine, based on the peripheral information, whether a plurality of other vehicles that are stopped exist on one side of a road in a width direction;

a second determination unit configured to determine, based on the peripheral information, whether a walker exists on the other side of the road in the width direction;

a third determination unit configured to determine, based on the peripheral information, whether a time elapsed from a stop of the other vehicles that are stopped is not more than a predetermined time;

a setting unit configured to, if the plurality of other vehicles that are stopped exist on the one side of the road in the width direction, and the walker exists on the other side of the road in the width direction, set, for the plurality of other vehicles, a second warning region wider than a first warning region in a case in which the plurality of other vehicles that are stopped exist on the one side of the road in the width direction, and the walker does not exist on the other side of the road in the width direction, wherein if the time elapsed from the stop of the other vehicles that are stopped is not more than the predetermined time, the setting unit sets a fourth warning region narrower than the second warning region for the other vehicles; and a control unit configured to control the self-vehicle such that the self-vehicle avoids a warning region set by the setting unit.

10. A vehicle comprising a processing apparatus of claim 1.

11. A processing method comprising:

acquiring peripheral information of a self-vehicle:

determining, based on the peripheral information, whether another vehicle that is stopped exists on one side of a road in a width direction;

determining, based on the peripheral information, whether a walker exists on the other side of the road in the width direction;

determining, based on the peripheral information, whether a time elapsed from a stop of the other vehicle that is stopped is not more than a predetermined time;

if the other vehicle that is stopped exists on the one side of the road in the width direction, and the walker exists on the other side of the road in the width direction, setting, for the other vehicle, a second warning region wider than a first warning region in a case in which the other vehicle that is stopped exists on the one side of the road in the width direction, and the walker does not exist on the other side of the road in the width direction, wherein if the time elapsed from the stop of the other vehicle that is stopped is not more than the predetermined time, in the setting, a fourth warning region narrower than the second warning region is set for the other vehicle; and controlling the self-vehicle such that the self-vehicle avoids a warning region set in the setting.

12. A non-transitory storage medium storing a program that causes a computer to execute steps of a processing method of claim 11.

* * * * *